(12) United States Patent
Takai et al.

(10) Patent No.: US 6,794,047 B2
(45) Date of Patent: Sep. 21, 2004

(54) RARE EARTH-CONTAINING OXIDE MEMBER

(75) Inventors: Yasushi Takai, Fukui-ken (JP); Noriaki Hamaya, Fukui-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/233,104

(22) Filed: Aug. 28, 2002

(65) Prior Publication Data

US 2003/0049500 A1 Mar. 13, 2003

(30) Foreign Application Priority Data

Aug. 29, 2001 (JP) ........................................ 2001-258981

(51) Int. Cl.[7] .............................. B32B 15/04; B32B 9/04
(52) U.S. Cl. ....................... 428/469; 428/689; 428/697; 428/699; 428/701; 428/702; 428/332
(58) Field of Search .................. 428/457, 469, 428/689, 697, 702, 701, 332

(56) References Cited

U.S. PATENT DOCUMENTS

| | | | |
|---|---|---|---|
| 5,560,993 A | * 10/1996 | Morimoto et al. | 428/408 |
| 6,143,060 A | 11/2000 | Fujii et al. | |
| 6,383,964 B1 | 5/2002 | Nakahara et al. | |
| 6,447,937 B1 | * 9/2002 | Murakawa et al. | 428/696 |
| 2002/0018921 A1 | * 2/2002 | Yamada et al. | 428/697 |
| 2003/0049499 A1 | * 3/2003 | Murakawa et al. | 428/697 |

FOREIGN PATENT DOCUMENTS

| | | |
|---|---|---|
| JP | 9316061 | 12/1997 |
| JP | 10045461 | 2/1998 |
| JP | 10045467 | 2/1998 |
| JP | 11-130565 | 5/1999 |
| JP | 11157916 | 6/1999 |
| JP | 2000191369 | 7/2000 |
| JP | 2000302577 | 10/2000 |

* cited by examiner

*Primary Examiner*—Stephen Stein
(74) *Attorney, Agent, or Firm*—Alston & Bird LLP

(57) ABSTRACT

The present invention is a rare earth-containing oxide member comprising a substrate comprising at least one element selected from group consisting of C, Si, Al, Ni, Ti, Fe, Mo, Ta and W, or an alloy comprising at least one element selected from group consisting of Si, Al, Ni, Ti, Fe, Mo, Ta and W; and a compound oxide laminated to the substrate, the compound oxide comprising a rare earth element (inclusive of Y) and Al and having a composition of 40 to 90 mole % of rare earth oxide and 10 to 60 mole % of $Al_2O_3$, based on the total amount of the oxides. The present invention also provides a heat-treating jig using such a rare earth-containing oxide member wherein the total amount of iron family elements, alkali metal elements and alkaline earth metal elements is not greater than 20 ppm.

15 Claims, No Drawings

RARE EARTH-CONTAINING OXIDE MEMBER

BACKGROUND OF THE INVENTION

1. Field of the Invention

This invention relates to heat-resistant or corrosion-resistant members which can be used, for example, as heat-treating jigs for use in the manufacture of semiconductors and as components of etching equipment used in a process for the manufacture of semiconductors or liquid crystal devices.

2. Description of the Related Art

In the manufacture of semiconductors, heat-treating jigs such as susceptors, liner tubes and wafer boats are being used. Since they come into contact with silicon wafers, they are required to have high purity, excellent thermal shock resistance to rapid heating and rapid cooling, and good chemical stability. Currently, members comprising carbon having SiC laminated thereto by CVD are being used.

Moreover, in the manufacture of semiconductors and liquid crystal devices, halogen-containing (fluorine- or chlorine-containing) corrosive gases having high reactivity are generally used for purposes of etching, film formation and the like. Consequently, high corrosion resistance is required of the parts coming into contact with such a halogen-containing corrosive gas or a plasma thereof, including the inner walls of plasma treatment equipment and jigs such as wafer supports, protective covers and insulating rings. For this reason, such contact parts have conventionally been formed of a material comprising chiefly quartz, $Al_2O_3$ or the like.

In recent years, the rates of rapid heating and rapid cooling have been increased in order to enhance the throughput in the manufacture of semiconductors. Consequently, the conventionally used members (comprising a carbon substrate having SiC laminated thereto by CVD) have posed problems, for example, in that they may fail to exhibit a good thermal response or they may be damaged by a thermal shock. Accordingly, there have been proposed a member in which an intermediate layer of SiC-C is disposed between the carbon substrate and SiC in order to lessen thermal shocks (Japanese Patent Provisional Publication No. 11-130565/'99) and a member in which the conditions of CVD and the properties of carbon are controlled so as to control the properties of SIC and thereby improve thermal shock resistance (Japanese Patent Provisional Publication No. 2000-302577). However, the aforesaid members are still insufficient in thermal shock resistance and corrosion resistance.

In order to further enhance the integration density of semiconductor circuit devices, halogen-containing corrosive gases having higher reactivity than conventional gases have come to be used during plasma processing. The conventionally used materials comprising chiefly quartz, $Al_2O_3$ or the like have insufficient corrosion resistance to such gases and, therefor, have posed problems in that their gas contact surfaces are etched to undergo a change in surface properties, and in that their transparency is reduced to cause an increase in rejection rate.

In order to solve these problems, compound oxides of rare earth elements and Al (e.g., YAG ($Y_3Al_5O_{12}$)), silicate compounds and the like have been proposed for use as members having excellent corrosion resistance to halogen-containing corrosive gases or plasmas thereof (see Japanese Patent Provisional Publication Nos. 10-45461/'98, 10-45467/'98 and 11-157916/'99). Although the corrosion-resistant members described in the aforementioned patents have excellent corrosion resistance, they are sintered bodies and hence have the disadvantage that their mechanical strength is not sufficient to produce large members.

In Japanese Patent Provisional Publication No. 10-45461/'98, it is described that compound oxides of rare earth elements and Al have excellent corrosion resistance to halogen-containing corrosive gases. However, sintered bodies made of such compound oxides of rare earth elements and Al are low in mechanical strength (in particular, toughness) and hence have the disadvantage that they may be broken during handling. For this reason, they have not been put to practical use. Moreover, in Japanese Patent Provisional Publication No. 2000-191369, it is described that, among compound oxides of rare earth elements and Al, $RE_3Al_5O_{12}$ (in which RE represents a rare earth element such as Y) having the garnet structure is most excellent in corrosion resistance to halogen-containing corrosive gas plasmas. However, sintered bodies made of such compound oxides of rare earth elements and Al having the garnet structure have the disadvantage that their mechanical strength is especially low.

SUMMARY OF THE INVENTION

An object of the present invention is to provide excellent members which have high purity, good thermal shock resistance and high mechanical strength and which are useful, for example, as heat-treating jigs for use in the manufacture of semiconductors and components of etching equipment used in a process for the manufacture of semiconductors or liquid crystal devices.

The present inventors made intensive investigations with a view to solving the above-described problems. As a result, it has been found that oxides composed of a rare earth oxide and $Al_2O_3$ in a specific proportion have the most excellent corrosion resistance. The present invention has been completed on the basis of this finding.

The present invention provides a rare earth-containing oxide member comprising a substrate comprising at least one selected from group consisting of C, Si, Al, Ni, Ti, Fe, Mo, Ta and W, or an alloy comprising at least one selected from group consisting of Si, Al, Ni, Ti, Fe, Mo, Ta and W; and a compound oxide laminated to the substrate, the compound oxide comprising a rare earth element (inclusive of Y) and Al and having a composition of 40 to 90 mole % of rare earth oxide and 10 to 60 mole % of $Al_2O_3$, based on the total amount of the oxides. The present invention also provides a heat-treating jig using such a rare earth-containing oxide member wherein the total amount of iron family elements, alkali metal elements and alkaline earth metal elements is not greater than 20 ppm.

DETAILED DESCRIPTION OF THE PREFERRED EMBODIMENTS

The material used in the present invention by lamination to a substrate comprises a compound oxide composed of a rare earth oxide and alumina. Preferably, the rare earth oxide and alumina are used in amounts of 40 to 90 mole % and 10 to 60 mole %, respectively, based on the total amount of the oxides, and more preferably in amounts of 50 to 80 mole % and 20 to 50 mole %, respectively.

The compound oxide may be in the form of either a single crystal or a polycrystal. When a rare earth element, inclusive of Y, is represented by "RE", the compound oxide is preferably used as a single $RE_4Al_2O_9$ phase or as a mixed phase comprising a principal $RE_4Al_2O_9$ phase and one or more rare earth oxide phases selected from the group consisting of $REAlO_3$, $RE_3Al_5O_{12}$, $RE_2O_3$, REO and the like. If the rare earth oxides are present in unduly small amounts, $RE_3Al_5O_{12}$ may constitute a principal phase, resulting in the formation of an $Al_2O_3$ phase and hence a reduction in mechanical strength and corrosion resistance. If they are present in unduly large amounts, a rare earth oxide phase such as $RE_2O_3$ will undesirably constitute a principal phase, resulting in low mechanical strength. The principal phase can be determined from a peak intensity in X-ray diffraction analysis. It can also be determined by means of an electron probe micro analyzer (EPMA).

The structure in which a rare earth element can exist stably varies with the type of the rare earth element, and its corrosion resistance is enhanced as the content of the rare earth element becomes higher. That is, the corrosion resistance increases in the order of $RE_4Al_2O_9$ (monoclinic structure)>$REAlO_3$ (perovskite structure)>$RE_3Al_5O_{12}$ (garnet structure). It is preferable to use a single $RE_4Al_2O_9$ (monoclinic structure). However, in the case, for example, of Y, even if raw materials are charged so as to produce $Y_4Al_2O_9$ (monoclinic structure), a slight deviation in composition will cause other structures to be produced as secondary phases. For example, if the content of Al deviates to the greater side, $Y_4Al_2O_9$ (monoclinic structure) will be produced as a principal phase, and $YAlO_3$ (perovskite structure) and $Y_3Al_5O_{12}$ (garnet structure) will be produced as secondary phases. In the case of Yb, since $Yb_4Al_2O_9$ (monoclinic structure) cannot exist stably, there may be produced a mixed phase comprising a principal phase of $Yb_4Al_2O_9$ (monoclinic structure) and other phases of $Yb_3Al_5O_{12}$ (garnet structure) and $Yb_2O_3$.

The rare earth-containing oxide member of the present invention is preferably such that the aforesaid compound oxide comprises a single $RE_4Al_2O_9$ phase having a monoclinic structure, or a mixed phase composed of a principal $RE_4Al_2O_9$ phase having a monoclinic structure and one or more phases selected from the group consisting of $REAlO_3$ having a perovskite structure, $RE_3Al_5O_{12}$ having a garnet structure, $RE_2O_3$ and REO. The structure may be analyzed by X-ray diffractometry or with an electron probe micro analyzer (EPMA). The term "principal $RE_4Al_2O_9$ phase" means that the compound oxide contains not less than 50% of $RE_4Al_2O_9$.

The rare earth element in the rare earth oxide used in the present invention may comprise one or more elements selected from Y and the elements of atomic numbers 57 to 71. Preferably, it is selected from Y, La, Ce, Gd, Tb, Dy, Ho, Er and Yb.

Compound oxides of alumina having a lower content of a rare earth oxide have excellent corrosion resistance, but have poor mechanical strength such as toughness. Accordingly, as contrasted with sintered bodies comprising a rare earth oxide alone, such a compound oxide may be laminated to a substrate in order to make up for its mechanical strength.

The material of the substrate used in the present invention comprises at least one selected from the group consisting of C, Si, Al, Ni, Ti, Fe, Mo, Ta and W, or an alloy comprising at least one metal selected from the group consisting of Si, Al, Ni, Ti, Fe, Mo, Ta and W. As preferred examples, there may used one or more materials selected from carbon, quartz, Al alloys (JIS 1000, 5000 or 6000), Ni alloys (Inconel or Hastelloy), Ti alloys (containing Al, Cu, Fe, Mo, Sn or V), Si alloys (containing Al, Cu or Ti), SUS, Mo, Ta and W.

The substrate used in the present invention may contain one or more additional elements such as Co, Cr, Cu, Mg or Zr.

Moreover, it is preferable that the material of the substrate used be selected so as to have a higher coefficient of thermal expansion than the oxide laminated thereto. While Al alloys, Ni alloys, Ti alloys, Si alloys, SUS, Mo, Ta and W have a higher coefficient of thermal expansion than oxide films, carbon may have a lower coefficient of thermal expansion. In such a case, it is desirable to provide an intermediate layer comprising a material selected from Al alloys, Ni alloys, Si alloys, SUS, Mo, Ta, W and the like. Although the thickness of the substrate may be suitably controlled according to the intended purpose, it is preferably in the range of 0.5 to 10 mm.

The thickness of the oxide layer of the present invention is preferably not less than 0.03 mm and not greater than 0.5 mm, and more preferably in the range of 0.1 to 0.3 mm. If its thickness is less than 0.03 mm, the oxide film is so thin that slight etching may cause the substrate to be exposed. If its thickness is greater than 0.5 mm, the oxide film is so thick that a separation may occur within the oxide film.

In a process for the manufacture of semiconductors, particles produced from the member undesirably may cause the contamination of silicon wafers. Accordingly, it is important to control the porosity and surface roughness of the oxide so as to inhibit the production of particles. As a measure of the amount of particles produced, the weight change caused by blast erosion may preferably be not greater than 200 mg. Thus, the member exhibits a strong adhesion of the film to the substrate, has good abrasion resistance, and hence achieves an improvement in characteristics. The weight change caused by blast erosion is calculated from the value obtained by a blast impact test method (JIS (Japanese Industrial Standard)-H8664) carried out by means of a spray abrasion tester (ACT-JP; Japanese Patent No. 1605315), and refers to a weight change produced by blowing particles against the film to abrade its surface.

When the aforesaid member is used as a heat-treating jig for the manufacture of semiconductors and, in particular, as a susceptor coming into direct contact with wafers, a problem often arises in that the wafers may be contaminated with one or more iron family elements (Fe, Co or Ni), one or more alkali metal elements (Na or K) and one or more alkaline earth metal elements (Mg or Ca) from the member, resulting in a reduced yield. The total amount of iron family elements, alkali metal elements and alkaline earth metal elements contained in the oxide of the present invention may preferably be not greater than 20 ppm and more preferably not greater than 5 ppm. Moreover, it is preferable to use raw materials (rare earth oxides and alumina), solvents and other materials having low impurity contents. The contents of iron family elements, alkali metal elements and alkaline earth metal elements can be determined by dissolving the member in a mixture of hydrofluoric acid and nitric acid and subjecting this solution to ICP spectroscopy (inductively coupled high-frequency plasma spectroscopy) or ICP-MS.

The rate at which the member is etched by an actually used halogen-containing corrosive plasma gas (in particular, $CF_4$ plasma) may be not greater than 200 $\mu g/cm^2$ hr. Thus, the member has excellent corrosion resistance and can hence be used as a corrosion-resistant member. In order to achieve such corrosion resistance, it may be necessary to minimize the surface roughness (Ra and Ray) of the member and, moreover, the surface area thereof. The surface roughness Ra is an arithmetic mean roughness as defined in JIS B 0601, and the surface roughness Ray is the maximum roughness which can be measured with a surface roughness meter. A rough surface has a large surface area and hence exerts an adverse influence on corrosion resistance to halogen-containing gas plasmas. The surface roughness Ra may be not greater than 6 μm and, moreover, the surface roughness Ray may preferably be not greater than 30 μm and more preferably not greater than 10 μm. Furthermore, the surface may be treated by buffing or the like. In addition, the porosity is also important because it affects the surface area, and it may preferably be not greater than 5%.

This member has excellent corrosion resistance to halogen-containing gas plasmas, and this thermally sprayed member of high purity can preferably be used as a component of the equipment for the manufacture of liquid crystal devices and as a component of the equipment for the manufacture of semiconductors.

In the present invention, a compound oxide layer may be formed on the substrate by mixing a rare earth oxide and alumina in a predetermined proportion and applying the resulting mixture to the substrate according to a film-forming technique. Useful film-forming techniques include vapor deposition, sputtering, CVD, thermal spraying, spin coating and the like. Where a process for laminating a compound oxide to the substrate at low temperatures is employed, there may be used such techniques as vapor deposition, sputtering and thermal spraying. However, where a process laminating a compound oxide at high temperatures (i.e., spin coating) is employed, there can be used only substrate materials undergoing no deformation at high temperatures, such as carbon, Mo, Ta and W.

However, from the viewpoint of mass production, it may be preferable to employ thermal spraying and, in particular, reduced-pressure thermal spraying or high-velocity thermal spraying (i.e., atmospheric thermal spraying of the HVOF or axial type). The velocity of the sprayed particles may be preferably not less than 400 m/s. For spraying purposes, a rare earth oxide (preferably having an average particle diameter of not greater than 1.5 μm) and aluminum oxide (preferably having an average particle diameter of not greater than 1.5 μm) may be mixed in a predetermined proportion and then formed into a slurry with the aid of water, alcohol or other medium containing a binder. This slurry may be granulated by means of a rolling granulator, spray granulator, compression granulator, fluidized granulator or the like. After drying, the granular material may be fired in air at 1,200–1,700° C. to obtain a spherical, free-flowing spray powder having an average particle diameter in the range of 5 to 80 μm. Then, a member may be made by thermally spraying this spray powder onto a substrate with the aid of a plasma or the like. Preferably, the average particle diameter of the spray powder may be in the range of 5 to 25 μm. The raw material is not limited to a mixture of a rare earth oxide and aluminum oxide, but may also comprise $RE_4Al_2O_9$ (monoclinic structure) alone, or a mixed powder comprising $RE_4Al_2O_9$ (monoclinic structure) as a principal component and one or more compounds selected from the group consisting of $REAlO_3$ (perovskite structure), $RE_3Al_5O_{12}$ (garnet structure), $RE_2O_3$ and REO. Furthermore, a compound, or a mixture of compounds, selected from the above group may be used by blending it with a rare earth oxide and/or alumina. The compounds used for this purpose may also be ones which can be converted to oxides by firing with the evolution of a relatively small amount of gas, such as carbonates and hydroxides.

The slurry concentration is not particularly limited, but may vary according to the granulation method. Preferably, the slurry concentration may be in the range of 10 to 50% by weight as a solid content.

As the binder, polyvinyl alcohol (PVA), carboxymethyl-cellulose (CMC), polyvinyl pyrrolidone (PVP), hexapropylcellulose (HPC), a phenolic resin, an epoxy resin or the like may be preferably used in an amount of 0.5 to 20% by weight based on the oxides.

Specifically, the compound oxide members formed on substrates in the above-described manner may be used, for example, as heat-treating members such as susceptors, liner tubes, wafer boats and vapor deposition crucibles.

Various embodiments of the present invention are described with reference to the following examples. However, these examples are not to be construed to limit the scope of the present invention.

EXAMPLES 1 TO 10

A rare earth oxide ($RE_2O_3$) (with an average particle diameter of 0.5 μm) and aluminum oxide ($Al_2O_3$) (with an average particle diameter of 0.5 μm) were blended and granulated according to the formulations shown in Table 1. Each of the resulting granular materials was thermally sprayed by HVOF, reduced-pressure plasma spraying or axial spraying. Properties of the members so formed are also shown in Table 1. The crystal structure was analyzed by means of an RADrB X-ray Diffractometer (manufactured by Rigaku Corp.). The porosity was calculated from the density measured by Archimedes' method. The contents of iron family elements, alkali metal elements and alkaline earth metal elements were measured by GD-MS. The surface roughness (Ra) was measured with an SE3500K Surface Roughness Meter (manufactured by Kosaka Laboratories). A weight change was measured with a spray abrasion tester (ACT-JP; Japanese Patent No. 1605315). The etching rate was determined by exposing the sprayed film to a $CF_4$ (80% by volume)+$O_2$ (20% by volume) plasma for 24 hours in a DEA-506 RIE Plasma Etching Apparatus (manufactured by Nichiden-Anelva Corp.) and calculating the etching rate from the weights and surface areas measured before and after etching. The results thus obtained are shown in Table 1.

Comparative Examples 1 to 3

A rare earth oxide ($RE_2O_3$) (with an average particle diameter of 0.5 μm) and aluminum oxide ($Al_2O_3$) (with an average particle diameter of 0.5 μm) were used individually or in admixture, and granulated. Each of the resulting granular materials was thermally sprayed by atmospheric plasma spraying. Properties of the members so formed are also shown in Table 1. The methods for measuring such properties were the same as those employed in the Examples.

TABLE 1

| | Composition | | Substrate | Thermal spraying method | Crystal structure (measured with EPMA) (%) | Film thickness (μm) | Surface roughness | | Porosity (%) | Weight loss (mg) | Results of measurement by GD-MS (ppm) | | | | | | Etching rate (μg/cm²hr) |
|---|---|---|---|---|---|---|---|---|---|---|---|---|---|---|---|---|---|
| | RE (mol %) | Al (mol %) | | | | | Ra (μm) | Ramax (μm) | | | CaO | Fe₂O₃ | MgO | Na₂O | NiO | Total | |
| Example 1 | Y 55 | 45 | Ta | Reduced Pressure | Y₄Al₂O₉ (55) YAlO₃ (5) Y₃Al₅O₁₂ (40) | 200 | 4 | 25 | 1.5 | 180 | 1 | 4 | 1 | 10 | 1 | 17 | 165 |
| Example 2 | Y 60 | 40 | C | HVOF | Y₄Al₂O₉ (80) Y₃Al₅O₁₂ (20) | 100 | 4 | 21 | 1.5 | 160 | 1 | 4 | 1 | 10 | 1 | 17 | 140 |
| Example 3 | Y 80 | 20 | Ni alloy | HVOF | Y₄Al₂O₉ (60) Y₂O₃ (40) | 100 | 3.5 | 18 | 1 | 120 | 1 | 3 | 1 | 8 | 1 | 14 | 90 |
| Example 4 | Y 67 | 33 | Al alloy | Axial | Y₄Al₂O₉ (100) | 150 | 2.5 | 16 | 0.5 | 110 | 1 | 1 | 1 | 8 | 1 | 12 | 90 |
| Example 5 | La 67 | 33 | Mo | Reduced Pressure | La₄Al₂O₉ (100) | 150 | 5.5 | 28 | 2 | 190 | 1 | 5 | 1 | 8 | 1 | 16 | 180 |
| Example 6 | Ce 67 | 33 | Al alloy | Reduced Pressure | Ce₄Al₂O₉ (100) | 150 | 3.4 | 23 | 1.8 | 180 | 1 | 5 | 1 | 8 | 1 | 16 | 170 |
| Example 7 | Gd 67 | 33 | C | Axial | Gd₄Al₂O₉ (100) | 100 | 5.5 | 19 | 0.3 | 60 | 1 | 1 | 1 | 3 | 1 | 7 | 50 |
| Example 8 | Gd 55 | 45 | Ti | Axial | Gd₄Al₂O₉ (60) Gd₃Al₅O₁₂ (35) GdAlO₃ (5) | 100 | 2.8 | 18 | 0.8 | 90 | 1 | 2 | 1 | 3 | 1 | 8 | 80 |
| Example 9 | Er 65 | 35 | C | HVOF | Er₄Al₂O₉ (95) Er₃Al₅O₁₂ (5) | 150 | 3.5 | 21 | 0.4 | 70 | 1 | 2 | 1 | 3 | 1 | 8 | 70 |
| Example 10 | Yb 75 | 25 | SiO₂ | HVOF | Yb₄Al₂O₉ (75) Yb₂O₃ (25) | 100 | 2.7 | 23 | 0.6 | 130 | 1 | 6 | 1 | 8 | 1 | 17 | 160 |
| Comparative Example 1 | — 0 | 100 | Al alloy | Atmosphere | Al₂O₃ (100) | 600 | 3 | 27 | 3 | 350 | 1 | 9 | 1 | 20 | 1 | 32 | 350 |
| Comparative Example 2 | Y 100 | 0 | Al alloy | Atmosphere | Y₂O₃ (100) | 600 | 4 | 32 | 7 | 310 | 1 | 6 | 1 | 25 | 1 | 34 | 300 |
| Comparative Example 3 | Y 38 | 62 | Al alloy | Atmosphere | Y₃Al₅O₁₂ (100) | 600 | 5 | 45 | 6 | 290 | 1 | 8 | 1 | 35 | 1 | 46 | 250 |

A comparison of the Examples with the Comparative Examples reveals that the members of the Examples exhibited a smaller weight change as caused by blast erosion, especially for Y, Gd and Er. This indicates that, as compared with the members of the Comparative Examples, the members of the Examples exhibit a stronger adhesion of the film to the substrate, higher abrasion resistance and a smaller amount of particles produced, and are hence believed to be usable as heat-treating members such as susceptors, liner tubers and wafer boats for use in the manufacture of semiconductors. Moreover, when the members were exposed to a $CF_4$ (80% by volume)+$O_2$ (20% by volume) plasma for 24 hours in an RIE plasma etching apparatus (manufactured by Nichiden-Anelva Corp.), the members of the Examples exhibited a lower etching rate than the members of the Comparative Examples, especially for Y, Gd and Er. This indicates that the members of the Examples have excellent corrosion resistance to a corrosive halogen-containing gas plasma and are hence believed to be usable as components of the equipment for the manufacture of semiconductors or liquid crystal devices.

What is claimed is:

1. A rare earth-containing oxide member comprising:
   a substrate comprising at least one element selected from group consisting of C, Si, Al, Ni, Ti, Fe, Mo, Ta and W, or an alloy comprising at least one element selected from the group consisting of Si, Al, Ni, Ti, Fe, Mo, Ta and W; and
   a layer of compound oxide laminated to the substrate;
   wherein the compound oxide comprises a rare earth metal element and Al and
   wherein the compound oxide has a composition of 40 to 90 mole % of rare earth metal oxide and 10 to 60 mole % of $Al_2O_3$, based on the total amount of the oxides.

2. The rare earth-containing oxide member as claimed in claim 1 wherein, the rare earth element is represented by "RE" and said compound oxide comprises a single $RE_4Al_2O_9$ phase having a monoclinic structure.

3. The rare earth-containing oxide member as claimed in claim 1 wherein a weight change caused by blast erosion is not greater than 200 mg.

4. The rare earth-containing oxide member as claimed in claim 2 wherein a weight change caused by blast erosion is not greater than 200 mg.

5. The rare earth-containing oxide member as claimed in claim 1 wherein a thickness of said layer of said compound oxide is not less than 0.03 mm and not greater than 0.5 mm.

6. The rare earth-containing oxide member as claimed in claim 2 wherein a thickness of said layer of said compound oxide is not less than 0.03 mm and not greater than 0.05 mm.

7. The rare earth-containing oxide member as claimed in claim 1 wherein a rate of etching caused by $CF_4$ plasma gas is not greater than 200 $\mu g/cm^2$ hr.

8. The rare earth-containing oxide member as claimed in claim 2 wherein a rate of etching caused by $CF_4$ plasma gas is not greater than 200 $\mu g/cm^2$ hr.

9. A heat-treating jig using a rare earth-containing oxide member as claimed in claim 1 wherein a total amount of iron family elements, alkali metal elements and alkaline earth metal elements is not greater than 20 ppm.

10. A heat-treating jig using a rare earth-containing oxide member as claimed in claim 2 wherein a total amount of iron family elements, alkali metal elements and alkaline earth metal elements is not greater than 20 ppm.

11. A rare earth-containing oxide member as claimed in claim 1 wherein, the rare earth element is represented by "RE" and said compound oxide comprises a mixed phase comprising a principal $RE_4Al_2O_9$ phase having a monoclinic structure and one or more phases selected from the group consisting of $REAlO_3$ having a perovskite structure, $RE_3Al_5O_{12}$ having a garnet structure, $RE_2O_3$ and REO.

12. A rare earth-containing oxide member as claimed in claim 11 wherein a weight change caused by blast erosion is not greater than 200 mg.

13. A rare earth-containing oxide member as claimed in claim 11 wherein a thickness of a layer of said complex oxide is not less than 0.03 mm and not greater than 0.5 mm.

14. A rare earth-containing oxide member as claimed in claim 11 wherein a rate of etching caused by $CF_4$ plasma gas is not greater than 200 $\mu g/cm^2$ hr.

15. A heat-treating jig using a rare earth-containing oxide member as claimed in claim 11 wherein a total amount of iron family elements, alkali metal elements and alkaline earth metal elements is not greater than 20 ppm.

* * * * *

UNITED STATES PATENT AND TRADEMARK OFFICE
CERTIFICATE OF CORRECTION

PATENT NO.        : 6,794,047 B2
APPLICATION NO. : 10/233104
DATED             : September 21, 2004
INVENTOR(S)       : Takai et al.

It is certified that error appears in the above-identified patent and that said Letters Patent is hereby corrected as shown below:

Column 7 and 8,

Table 1, Example 2 should appear as follows:

Table 1

| | Composition | | Substrate | Thermal spraying method | Crystal structure (measured with EPMA) (%) | Film thick -ness ($\mu m$) | Surface roughness | | Porosity (%) | Weight loss (mg) | Results of measurement by GD-MS (ppm) | | | | | | Etching rate ($\mu g/cm^2 hr$) |
| --- | --- | --- | --- | --- | --- | --- | --- | --- | --- | --- | --- | --- | --- | --- | --- | --- | --- |
| | RE (mol%) | Al (mol%) | | | | | Ra ($\mu m$) | Ramax ($\mu m$) | | | CaO | $Fe_2O_3$ | $K_2O$ | $Na_2O$ | $H_2O$ | Total | |
| Example 2 | Y 60 | 40 | C | HVOF | $Y_4Al_2O_9$ (80) $Y_3Al_5O_{12}$ (20) | 100 | 4 | 21 | 1.5 | .160 | 1 | 4 | 1 | 10 | 1 | 17 | 140 |

Signed and Sealed this

Fifth Day of June, 2007

JON W. DUDAS
*Director of the United States Patent and Trademark Office*